United States Patent Office 2,954,321
Patented Sept. 27, 1960

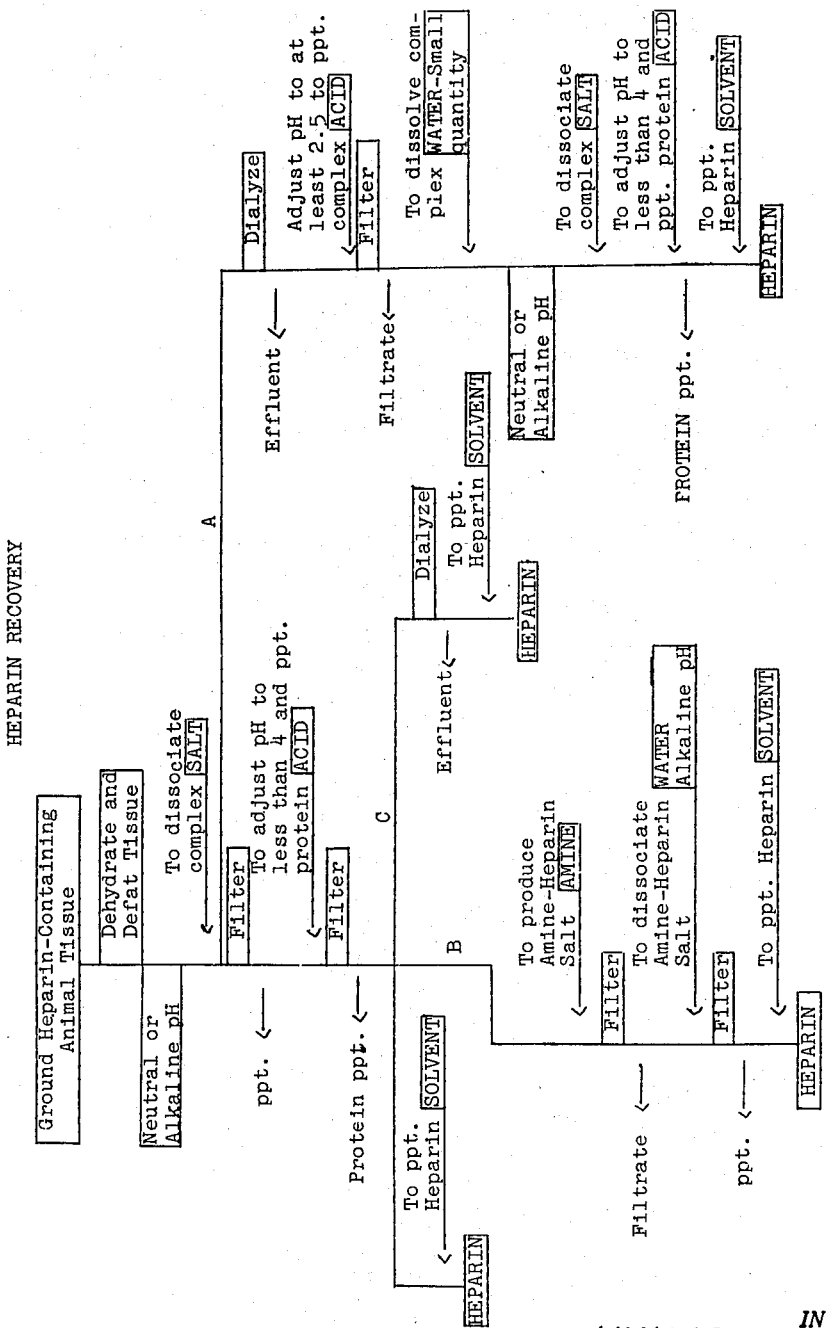
Figure I

2,954,321

PROCESS FOR PREPARING HEPARIN

Lester L. Coleman, Robert T. Shane, and Lucian Bayard Spaulding, Kalamazoo, Mich., assignors to The Upjohn Company, Kalamazoo, Mich., a corporation of Michigan Filed Sept. 23, 1957, Ser. No. 685,382

7 Claims. (Cl. 167—74)

The present invention relates to a novel organic process and more particularly relates to a novel process for the recovery of heparin from defatted animal tissue.

In carrying out the present process heparin is released and recovered from defatted animal tissue by extracting the tissue with a salt solution thereby avoiding autolysis or other conditions which affect the yield, purity of product, and the ease of separation of heparin from the reaction mixture.

In the usual recovery of heparin from animal tissues, such as beef or pork lung, liver, duodenum, and muscle, the procedure based upon work by Charles et al. [J. Biol. Chem. 102, 425 (1933), and upon the process described by them in Roy. Soc. Can. Trans. 28, sec. 5, 55–58 (1934)], has generally been followed. The procedure ordinarily involves the autolysis of the animal tissues involved, generally in the presence of added water [Kuizenga and Spaulding, J. Biol. Chem. 148, 641 (1943)], and at an elevated temperature, alkaline extraction of the autolyzed mixture, usually completed with ammonium sulfate and sodium hydroxide, heating of the resulting mixture to approximately eighty degrees centigrade and filtering to remove the coagulated substance. The resulting filtrate upon acidification produces a protein-heparin complex as a precipitate which, according to the above-mentioned process, is subjected to the action of a proteolytic enzyme, e.g., trypsin, in order to effect an enzymatic digestion of the denatured protein material contained in the complex. A subsequent treatment of the digestion mixture with an alcohol or acetone precipitates the desired heparin in a crude form.

Charles et al. also indicate that immediate extraction of the tissue by using sodium hydroxide and ammonium sulfate to avoid the autolysis step can be used but the process results in poorer yields of heparin than when the autolysis step is employed.

In U.S. Patent 2,587,924 is described a process of obtaining heparin by mincing and mixing tissue with water, heating, draining the excess water, subjecting the tissue to a proteolytic enzyme preparation, and recovering heparin from the resulting mixture. It is specifically pointed out in the disclosure that optimum temperature conditions are necessary during the enzymatic action in order to bring about digestion of the protein and suppression of the bacterial action. It is also to be noted that large quantities of proteolytic enzyme are employed in order to remove the protein material. This tends, of course, to introduce an additional quantity of undesirable proteinaceous material into the mixture and increases the overall cost of the entire operation. Moreover, the resulting heparin yields are relatively low.

In another process described in U.S. Patent 2,623,001 heparin is extracted under mild conditions (without autolysis, alkaline extraction, or heat) so as to avoid denaturing the protein and heparin is recovered from the resulting water-soluble heparin-protein complex by adding a soluble salt to saturate the complex solution, while maintaining the pH between 6.5 and 10.0, in order to precipitate the protein.

The above-described processes require either that the tissue be autolyzed for a specific period of time or that the tissue be subjected to extraction or to an expensive proteolytic enzyme action under critical conditions. These prior art processes possess definite disadvantages. The autolysis step, e.g., is a time-consuming and generally unsatisfactory procedure due to the putrefaction involved and the odor which is generally associated with this problem. The use of proteolytic enzyme increases the cost and at the same time introduces more undesirable proteinaceous material into the mixture.

Another essential disadvantage of the autolysis step is the danger of contamination by pyrogens whose formation is generally attributed to the action of anaerobic bacteria. During the autolysis step, of course, the bacterial population multiplies tremendously, thus increasing the possibility of pyrogenic contamination. However, any attempt to reduce the bacterial population during autolysis by virtue of bacteriostats or careful control of reaction conditions tends also to reduce the heparin yield since the bacteria are apparently essential for maximum heparin yields in the autolysis procedure.

Attempts to avoid the autolysis step and the obnoxious odor associated therewith by the prior art have proven unsatisfactory since the reaction conditions are so critical that the result usually is a mediocre yield of heparin. In U.S. Patent 2,623,001, described above, it is particularly pointed out that reaction conditions are critical in order to avoid denaturing the protein which denatured protein can then only be removed, according to the patentee, by enzymatic digestion. The yield of recovered heparin from such a process is only mediocre. Similarly, in U.S. Patent 2,587,924, described above, the autolysis step is avoided. However, despite the fact that the process apparently avoids the odor problem by suppressing the bacterial action the yields of heparin only average about 7,000 units per pound of fresh tissue even though large quantities of proteolytic enzyme are employed. This is in contrast to the 12,000 units, or more, of heparin per pound of fresh tissue, or 60,000 units of heparin per pound of defatted tissue, produced by the present process.

Therefore, any attempt to control the putrefaction, or odor problem, or to minimize the introduction of pyrogens into the product, by utilizing the prior art procedures necessitates the use of conditions which result in less than desirable yields of heparin. The use of defatted animal tissue as in the process of the present invention thus clearly avoids the undesirable autolysis step with its accompanying putrefaction or odor problem, introduction of pyrogens, and less than desirable yields of heparin.

It is thus an object of the present invention to provide a process for the recovery of heparin from defatted animal tissue. Another object of the present invention is to provide a process for the preparation of heparin which reduces the time involved in the liberation of heparin from animal tissues. It is also an object of the present invention to provide a process which produces a greater yield of purer heparin having a higher anticoagulant activity in terms of assay units per milligram than is generally obtained by known procedures. Still another object of the present invention is to provide a process which is odor-free without any sacrifice in yield of heparin. An additional object of the present invention is to produce a product which is relatively free of pyrogenic contamination.

In carrying out the process of the present invention as substantially shown in Figure 1, ground, defatted animal tissue, maintained at a pH of at least 7, preferably at an alkaline pH of 8 to 10, inclusive, is extracted with a salt solution. Salts operating most satisfactorily are those which are water-soluble, dissociated, and which do not react with other components of the system to form precipitates which would remove the salts from solution or remove heparin from solution. Representative salts which can effectively be utilized include the alkali-metal and ammonium citrates, halides, acetates, sulfates or thiocyanates or alkaline-earth halides, acetates, or citrates.

Salt concentrations found to be most effective in the process should be sufficient to provide an anion concentration between about one mole per liter of mixture and saturation, e.g., at least one mole of sodium chloride, at least one mole of sodium thiocyanate, at least one mole of sodium sulfate, or at least one-half mole of calcium chloride. The preferred salt employed in the process of the present invention is sodium chloride at a concentration of at least about sixty grams per liter, preferably from about 100 to about 150 grams per liter.

The temperature at which the extraction is effected is advantageously between about twenty and about sixty degrees centigrade. Lower temperatures down to about zero degrees centigrade and higher temperatures up to about 100 degrees centigrade can be used, however, if desired.

Although the mechanism of the present invention is not thoroughly understood, it is believed that the fatty material in the cell membrane of fresh or frozen tissue prevents the extracting medium from readily contacting the native protein-heparin complex. The prior art procedures which have been generally used for extracting the heparin-protein complex unfortunately are too drastic, e.g., a strong alkaline solution has been employed, but its use unfortunately denatures the native protein. The denatured protein tightly binds the heparin and multiplies the difficulty of heparin separation. The removal of the fatty material from the cells apparently leaves a network through which the heparin and protein in a dissociated form can be extracted by the salt solution. It is believed that the protein-heparin complex is dissociated by the salt by a mechanism wherein the negative ion of the salt exchanges with heparin on the undesirable protein material thus permitting the heparin to be easily separated.

Heparin can be recovered from the resulting salt extract by acidification to precipitate the protein, separating the protein by centrifugation or filtration, and recovering the partially purified heparin from the filtrate by the addition of an alcohol or acetone.

The precipitation of the protein from the resulting salt extract is effected by adding any strong acid such as sulfuric acid, hydrochloric acid, trichloroacetic acid, or the like. Any acid of sufficient strength to lower the pH enough to effect coagulation of the protein may be used. The pH necessary for this purpose ordinarily lies below pH 4, advantageously about pH 2.5.

After the precipitated protein is removed by filtering or centrifuging, the filtrate or centrifugate is treated to recover the heparin. Ordinarily this is done by adding methyl or ethyl alcohol, acetone, on other water-miscible organic solvent to precipitate the heparin. In the instances where the salt, e.g., sodium sulfate, is not very soluble in ethyl alcohol or acetone, it is desirable, in order to avoid contamination of the precipitated heparin with the salt, to subject the filtrate to dialysis in order to remove the undesirable salt before the heparin is precipitated as substantially shown in process C of Figure I. Alternatively, the precipitated heparin containing the salt impurity can be purified by dissolving the impure heparin in water, dialyzing the solution to remove the undesirable salt, and reprecipitating the heparin to a greater degree of purity with alcohol or acetone as described above.

Other processes are available for the recovery of heparin from the salt extract which eliminate the necessity of handling large volumes of material. The volume of recovered salt extract is generally fairly large and concentration of the heparin-containing mixture is, therefore, highly desirable in order to minimize transportation and handling problems. Moreover, unless the heparin-containing mixture is concentrated then the recovery of heparin from the mixture requires the addition of at least two volumes of acetone or alcohol to the mixture, as discussed above, which further adds to the volume problem.

One process which minimizes the volume problem quite satisfactorily is substantially shown in process A of Figure I and involves removing the salt from the original extract by dialysis, and acidifying the dialysate to a pH of at least 2.5 to precipitate the protein-heparin complex. The protein-heparin complex is then treated in the same manner as the original defatted animal tissue in order to eliminate the protein and recover the heparin therefrom, i.e., the complex is redissolved at a pH of about ten in a volume of water much smaller than that of the original extract, sufficient water soluble salt is added to said solution in order to dissociate the complex, the mixture is acidified to a pH of about 2.5 to precipitate the protein, and heparin is recovered from the remaining solution by adding methyl or ethyl alcohol or other water miscible organic solvent.

Heparin can also be recovered from the filtrate while minimizing the handling of large volumes of material by acidifying the salt extract to precipitate the protein, separating the protein by filtration, and adding a fatty amine such as octylamine, dodecylamine, or the like, to the heparin-containing filtrate in order to precipitate an amine-heparin salt as substantially shown in process B of Figure I. The heparin is recovered from the amine-heparin salt by reslurrying the amine-heparin salt in water with an alkali at a pH of about 10 to dissociate the salt, filtering, and adding alcohol or acetone to the filtrate to precipitate the heparin.

The defatting of the animal tissues can be accomplished utilizing the processes described in U.S. Patents 2,619,425 or 2,539,544.

The following examples are illustrative of the process and products of the present invention, but are not to be construed as limiting.

EXAMPLE 1

One hundred pounds of finely ground dehydrated and defatted beef lung tissue was slurried in 150 gallons of tenth normal sodium hydroxide solution containing twelve percent sodium chloride. The slurry was heated to fifty degrees centigrade, stirred for one hour and allowed to stand for eight hours. Twenty pounds of filter aid (Celite 512) was added and the slurry was filtered on a plate and frame press. The filter cake was reslurried in fifty gallons of fresh salt solution and the slurry was filtered again. The two filtrates were then combined. Ten pounds of filter aid were added to the combined filtrates and the pH was lowered to 2.5 by the addition of concentrated hydrochloric acid. The mixture was filtered immediately, and the cake was washed with twenty gallons of twelve percent sodium chloride solution brought to pH 2.5 with hydrochloric acid.

The pH of the combined filtrate and washings was then raised to 5.5 with sodium hydroxide, after which eight gallons of a ten percent solution of octylamine hydrochloride was added with rapid stirring. After standing for eight hours, the mixture was filtered following the addition of ten pounds of filter aid.

The filter cake was slurried in hot water and the pH was raised to ten with sodium hydroxide. After stirring for two hours, the mixture was filtered and the filter cake washed with hot water at pH 10. The washings were then combined with the main filtrate.

The pH was adjusted to 5.5 and two volumes of ethyl alcohol were added to the mixture. After standing for eight hours, the supernatant liquid was decanted and discarded. The precipitate was washed first with ethyl alcohol, then with acetone, followed by drying at sixty degrees centigrade under reduced pressure. The yield was 93 grams of heparin assaying 67 U.S.P. units per milligram.

EXAMPLE 2

One pound of ground dehydrated lung tissue was further dried under reduced pressure at 100 degrees centigrade for three hours, then refluxed for four hours with 3.5 liters of chloroform in order to defat the tissue. The chloroform extract was then removed by filtration and the excess solvent removed from the residue by drying under reduced pressure at 67 degrees centigrade for three hours.

The resulting defatted tissue was slurried with five liters of twelve percent sodium chloride solution, the pH was raised to eight by means of ten percent sodium hydroxide solution, the mixture was stirred for one hour at 25 degrees centigrade and then centrifuged for thirty minutes at 1500 r.p.m. This process was repeated twice more and the three extracts were combined.

The pH of the combined extracts was reduced to 2.5 with concentrated hydrochloric acid and the resulting precipitate removed by centrifugation at 1500 r.p.m. for one hour. The centrifugate was treated with ten percent sodium hydroxide solution to bring the pH to 6.0 whereupon, two volumes of ethyl alcohol was slowly added with stirring. After standing for eight hours the precipitate was collected by centrifugation. It was redissolved in 800 milliliters of water and brought to pH 10 by addition of sodium hydroxide. It was then reprecipitated by adding two volumes of alcohol and the mixture was allowed to stand for eight hours. The supernatant was discarded and the precipitate was washed successively with 67 percent alcohol, 95 percent alcohol, and acetone. The resulting heparin was dried under reduced pressure at 65 degrees centigrade and 6.9 grams of product was obtained which assayed twelve U.S.P. anticoagulant units per milligram.

EXAMPLE 3

One pound of dehydrated and defatted beef lung, prepared as described in Example 2, was extracted twice with five liter-portions of twelve percent sodium chloride solution at pH 8.0. Each extraction was carried out at thirty degrees centigrade for two hours. The combined extracts were dialyzed for ten hours against running tap water, and then adjusted to pH 2.5 with hydrochloric acid. The resulting precipitate was collected by centrifugation, and redissolved in 500 milliliters of water by adjusting the pH to ten with sodium hydroxide. Fifty grams of sodium chloride was dissolved in the solution and the pH was lowered to 2.5 by the addition of concentrated hydrochloric acid with rapid stirring. The precipitate which formed was removed by centrifugation and the supernatant solution was treated with sodium hydroxide to raise the pH to 6.8. Two volumes of ethyl alcohol were added with rapid stirring and the mixture was allowed to stand for eight hours at 25 degrees centigrade. The supernatant liquid was decanted and the precipitate was washed with acetone and dried. The heparin thus obtained assayed fifty U.S.P. units per milligram and consisted of a total of 84,000 U.S.P. units.

EXAMPLE 4

One hundred grams of dehydrated and defatted duodenal tissue was slurried in 1100 milliliters of twelve percent aqueous sodium chloride solution at 30 to 32 degrees centigrade. The pH of the slurry was adjusted to 8.5 with 25 percent aqueous sodium hydroxide solution and the mixture was stirred for about ten hours. Thirty grams of diatomaceous earth was added and the slurry was filtered in a Buechner funnel. The precipitate was reslurried in 550 milliliters of fresh twelve percent aqueous sodium chloride solution for one hour and the slurry was again filtered. The filtrates were combined and ten grams of diatomaceous earth was added and the mixture was acidified to pH 2.5 with 31 percent hydrochloric acid. The mixture was filtered immediately in a Buechner funnel. The pH of the filtrate was adjusted to 6.0 with 25 percent aqueous sodium hydroxide solution. Octylamine hydrochloride solution was added (6.6 grams of octylamine equivalent) and the mixture was allowed to stand for ten hours at 25 degrees centigrade. Ten grams of diatomaceous earth was added and the mixture was filtered in a Buechner funnel. The filter cake was slurried in fifty milliliters of water with the pH adjusted to 11.5 with 25 percent aqueous sodium hydroxide solution for two hours and the slurry was again filtered in a Buechner funnel. The pH of the filtrate was adjusted to 5.5 with 31 percent hydrochloric acid and the solution was chilled to five degrees centigrade. An equal volume of acetone was added to the solution and the mixture was allowed to stand in the cold for 48 hours. The supernatant aqueous acetone solution was removed by decantation and the precipitate was washed with fresh acetone, filtered, and dried under vacuum at sixty degrees centigrade. The weight of the crude heparin was 310 milligrams and assayed 93,000 units per pound of tissue. The potency of heparin assayed 65 U.S.P. units per milligram.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. In a process for the recovery of heparin the steps of mixing an aqueous mixture of heparin and protein-containing defatted animal tissue at a pH of between about seven and about ten with sufficient water-soluble salt to produce an anion concentration of between about one mole per liter of mixture and about saturation, precipitating the protein by the addition of an acid, filtering, and recovering heparin from the filtrate.

2. In a process for the recovery of heparin the steps of mixing an aqueous mixture of heparin and protein-containing defatted animal tissue at a pH of between about seven and about ten with sufficient sodium chloride to produce an anion concentration of between about one mole per liter of mixture and about saturation, precipitating the protein by the addition of an acid, filtering, and recovering heparin from the filtrate.

3. In a process for the recovery of heparin the steps of mixing an aqueous mixture of heparin and protein-containing defatted animal tissue at a pH of between about seven and about ten with about 100 to about 150 grams of sodium chloride per liter of mixture, precipitating the protein by the addition of an acid, filtering, and recovering heparin from the filtrate.

4. In a process for the recovery of heparin the steps of mixing an aqueous mixture of heparin and protein-containing defatted animal tissue at a pH of between about seven and about ten with sufficient water soluble salt to produce an anion concentration of between about one mole per liter of mixture, and about saturation, filtering, acidifying the salt-containing filtrate to a pH of less than four to precipitate the protein, and mixing the resulting filtrate with a fatty amine to precipitate the fatty amine salt of heparin, and recovering heparin therefrom.

5. In a process for the recovery of heparin the steps of mixing an aqueous mixture of heparin and protein-containing defatted animal tissue at a pH of between about seven and about ten with sufficient water soluble salt to produce an anion concentration of between about one mole per liter of mixture, and about saturation, filtering, acidifying the filtrate to a pH of less than four to precipitate the protein, and recovering heparin from the filtrate.

6. In a process for the recovery of heparin the steps of mixing an aqueous mixture of heparin and protein-containing defatted animal tissue at a pH of between about seven and about ten with sufficient water soluble salt to produce an anion concentration of between about one mole per liter of mixture, and about saturation, filtering, acidifying the filtrate to a pH of less than four to precipitate the protein, adding sufficient alkali to the filtrate to raise the pH to about six, and precipitating the heparin from the mixture by the addition of an alcohol.

7. In a process for the recovery of heparin the steps of mixing an aqueous mixture of heparin and protein-containing defatted animal tissue at a pH of between about seven and about ten with sufficient water soluble salt to produce an anion concentration of between about one mole per liter of mixture, and about saturation, filtering, dialyzing the filtrate, acidifying the dialyzed solution to a pH of less than four to precipitate the heparin-protein complex, redissolving the complex in water at a pH of between about seven and ten, adding sufficient water soluble salt to the mixture to produce an anion concentration of between about one mole per liter of mixture, and about saturation, acidifying the mixture to a pH of less than four to precipitate the protein, and recovering heparin from the filtrate.

References Cited in the file of this patent

UNITED STATES PATENTS

| | | |
|---|---|---|
| 2,552,507 | O'Keeffe et al. | May 15, 1951 |
| 2,623,001 | Sylven et al. | Dec. 23, 1952 |
| 2,797,184 | Coleman et al. | June 25, 1957 |